United States Patent
Stirling

(10) Patent No.: US 10,421,512 B2
(45) Date of Patent: Sep. 24, 2019

(54) CONVERTIBLE TOP REMOVAL DEVICE AND METHOD

(71) Applicant: Larry Stirling, Pataskala, OH (US)

(72) Inventor: Larry Stirling, Pataskala, OH (US)

( * ) Notice: Subject to any disclaimer, the term of this patent is extended or adjusted under 35 U.S.C. 154(b) by 0 days.

(21) Appl. No.: 15/866,068

(22) Filed: Jan. 9, 2018

(65) Prior Publication Data

US 2018/0290701 A1 Oct. 11, 2018

Related U.S. Application Data

(60) Provisional application No. 62/444,013, filed on Jan. 9, 2017.

(51) Int. Cl.
*B62D 65/06* (2006.01)
*B60J 7/10* (2006.01)
*B62D 65/02* (2006.01)
*B65G 1/02* (2006.01)

(52) U.S. Cl.
CPC .............. *B62D 65/06* (2013.01); *B60J 7/106* (2013.01); *B62D 65/026* (2013.01); *B65G 1/026* (2013.01)

(58) Field of Classification Search
CPC ........ B62D 65/06; B62D 65/026; B60J 7/106; B60J 11/00; B65G 1/026; B66D 1/04; B66D 1/12; B66D 3/04; B66D 3/00; B66D 3/18; B66C 23/48; B66C 1/28; B66C 1/62; B66C 1/64
USPC ....................................... 211/13.1
See application file for complete search history.

(56) References Cited

U.S. PATENT DOCUMENTS

| | | | | |
|---|---|---|---|---|
| 2,792,945 A | * | 5/1957 | Brenny | A61G 7/1015 212/337 |
| 4,173,334 A | * | 11/1979 | Lombard | B66F 9/122 294/67.1 |
| 4,576,542 A | * | 3/1986 | Brasell | B66D 3/00 294/67.1 |
| 4,600,177 A | * | 7/1986 | Fritz | B60J 7/106 254/338 |
| 4,671,724 A | * | 6/1987 | Bolton | B65G 59/063 221/283 |
| 4,867,465 A | * | 9/1989 | Dunchock | B62B 3/108 280/79.3 |
| 4,941,645 A | * | 7/1990 | Hall | B62B 3/0637 254/324 |
| 5,131,620 A | * | 7/1992 | Boundy | A47B 21/0314 248/225.11 |

(Continued)

*Primary Examiner* — Patrick D Hawn
(74) *Attorney, Agent, or Firm* — Standley Law Group LLP; Beverly A. Marsh; Adam J. Smith

(57) ABSTRACT

The present invention is a hardtop removal and storage system and method that comprises a front and rear support arm. The support arms may be mounted to a ceiling such that they are allowed to pivot together and apart. A vehicle may be positioned such that the rear support arm is in contact with a removable hardtop configured to be used with the vehicle. The vehicle hardtop may then be removed by raising the hardtop away from the vehicle and causing the front and rear support arms to pivot underneath of the hardtop. Once positioned in such a manner, the front and rear support arms may retain the hardtop, permitting the owner or driver of the vehicle to move the vehicle out from underneath the invention while the hardtop remains supported by the front and rear support arms.

16 Claims, 9 Drawing Sheets

(56) References Cited

U.S. PATENT DOCUMENTS

| | | | | |
|---|---|---|---|---|
| 5,193,479 A * | 3/1993 | Bielefeld | B63B 23/32 | 114/259 |
| 5,263,687 A * | 11/1993 | Garbiso | B60J 11/00 | 248/327 |
| 5,269,417 A * | 12/1993 | Zelnik | B60R 9/00 | 211/13.1 |
| 5,445,279 A * | 8/1995 | Warner | B62B 3/022 | 211/195 |
| 5,664,821 A * | 9/1997 | Crowson | B25H 3/00 | 294/67.1 |
| 5,871,070 A * | 2/1999 | Contreras | B66D 1/04 | 187/263 |
| 5,897,104 A * | 4/1999 | Garbiso | B66C 1/18 | 248/327 |
| 5,984,275 A * | 11/1999 | Hoslett | B60J 11/00 | 248/327 |
| 6,042,165 A * | 3/2000 | Thompson | B66C 1/62 | 294/67.1 |
| 6,056,274 A * | 5/2000 | Naas | B63C 15/00 | 248/317 |
| 6,152,427 A * | 11/2000 | Hoslett | B60J 11/00 | 248/327 |
| 6,361,022 B1 * | 3/2002 | Lob | B63C 15/00 | 114/44 |
| 6,386,515 B1 * | 5/2002 | Sachtleben | B66D 1/04 | 248/320 |
| 6,823,808 B2 * | 11/2004 | Clary | B63C 3/06 | 114/44 |
| 6,857,529 B2 * | 2/2005 | Lopez Alba | B66C 13/06 | 212/273 |
| 6,959,918 B1 * | 11/2005 | Samuels | B60J 7/106 | 248/327 |
| 7,194,971 B2 * | 3/2007 | Stolzer | B63C 3/06 | 114/44 |
| 7,467,784 B2 * | 12/2008 | Turner | B60J 11/00 | 135/90 |
| 7,568,678 B2 * | 8/2009 | Hammond | B66C 1/62 | 248/327 |
| 8,328,029 B1 * | 12/2012 | Binsfeld | B66F 7/02 | 187/240 |
| 8,418,814 B1 * | 4/2013 | Byers | B66D 1/54 | 182/144 |
| 8,544,823 B2 * | 10/2013 | Imberi | B66D 1/36 | 254/338 |
| 8,556,311 B1 * | 10/2013 | Lucero | B66C 1/107 | 294/67.3 |
| 9,409,750 B2 * | 8/2016 | Smith | B60J 7/1607 | |
| 9,561,145 B2 * | 2/2017 | Jackson | A61G 13/0036 | |
| 9,643,823 B2 * | 5/2017 | Hall | B66C 23/48 | |
| 9,909,713 B1 * | 3/2018 | Brockie | F16M 13/022 | |
| 9,932,209 B2 * | 4/2018 | Smith | A47B 81/00 | |
| 10,035,408 B2 * | 7/2018 | Crismon | B60J 7/106 | |
| 10,093,521 B2 * | 10/2018 | King | B66C 1/16 | |
| 10,099,906 B2 * | 10/2018 | Smith | B66C 23/48 | |
| 10,179,720 B2 * | 1/2019 | Smith | B66C 1/28 | |
| 2003/0184106 A1 * | 10/2003 | Windecker | B66C 1/10 | 294/81.5 |
| 2006/0065807 A1 * | 3/2006 | Hanlon | B66D 1/12 | 248/327 |
| 2006/0180069 A1 * | 8/2006 | Stolzer | B63C 3/06 | 114/44 |
| 2007/0267614 A1 * | 11/2007 | Turner | B60J 11/00 | 254/334 |
| 2009/0035115 A1 * | 2/2009 | Hammond | B66C 1/62 | 414/592 |
| 2009/0309079 A1 * | 12/2009 | Lacina | B60J 7/106 | 254/47 |
| 2011/0127477 A1 * | 6/2011 | Kokolis | B66C 13/16 | 254/285 |
| 2013/0214224 A1 * | 8/2013 | Byers | B66D 1/54 | 254/272 |
| 2013/0280020 A1 * | 10/2013 | O'Brien | B66C 23/36 | 414/543 |
| 2016/0257535 A1 * | 9/2016 | Hall | B66C 23/48 | |
| 2018/0290701 A1 * | 10/2018 | Stirling | B62D 65/06 | |

* cited by examiner

CONVERTIBLE TOP REMOVAL DEVICE AND METHOD

CROSS-REFERENCE TO RELATED APPLICATION

This non-provisional application claims priority to U.S. Provisional Application No. 62/444,013, filed Jan. 9, 2017, the contents of which are incorporated by reference as if fully recited herein.

TECHNICAL FIELD

Exemplary embodiments of the present invention relate generally to a device for assisting a user with the removal and installation of a vehicle hardtop.

BACKGROUND OF THE INVENTION

Convertible vehicles are popular in that they provide an open air driving environment for a driver when the convertible top is lowered. In most cases, these convertible tops are flexible cloth that are affixed to a folding frame. The top can be lowered by releasing one or more fasteners and folding the top down. Conversely, a user may raise the top when threatened with bad weather or the need to park the vehicle. Flexible cloth tops have shortcomings with regard to security, sound isolation and temperature control. As a result, many vehicles may be equipped or retrofitted with rigid tops that are affixed to the vehicle in place of the flexible top. Rigid tops may provide greater security against theft, better sound isolation, and better temperature control. Unlike the previously described flexible tops, rigid tops generally cannot be folded or otherwise collapsed. As a result, the installation and removal of these tops is generally more difficult for a user than flexible tops. This is particularly the case when the user is unable to secure the assistance of a second person. A device is needed to assist a user in the installation and removal of a rigid top.

SUMMARY OF THE INVENTION

Embodiments of the invention may comprise a front and a rear support arm. These support arms may be affixed to the ceiling of a garage or other structure and pivot under the front and rear edges of a rigid top. Embodiments of the invention may include arms that may be affixed such that they are capable of being pivoted so as to allow the rigid top to be lifted slightly to allow the support arm of the invention to pivot underneath an edge of the top, suspending that portion of the top on the pivoted arm. A user may then pivot a second arm and position that arm underneath a second surface of the top. The result is that the top may be suspended slightly above the front and rear edge of the vehicle. Once the top has been suspended in this manner, the user may cause the vehicle to be moved out from under the top, leaving the top suspended from the ceiling of a garage or other structure. The user may then apply a flexible top to the vehicle or simply leave the vehicle uncovered.

Embodiments of the invention may include adjustments to allow the pivoting arms to be adjustable from side to side in order to accommodate a vehicle that isn't positioned as to be aligned with the arms that comprise the invention.

Embodiments of the invention may also include adjustments to the length of the arms to accommodate various vehicle and ceiling heights.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness. In addition, the terms "owner" and "user" may be used interchangeably to refer to a person who is using an embodiment of the invention.

Convertible vehicles are popular for the open-air feeling that they provide the driver and passengers of a vehicle. Generally, convertible vehicles are equipped with a flexible top that may be folded away to open the top portion of the vehicle. While such flexible tops provide a convenient way to open and close the convertible top of the vehicle, such tops are generally constructed of a heavy fabric material. This material is generally not able to provide a secure enclosure for valuables stored in the vehicle as the fabric material may be cut using a knife or other sharp implement. Additionally, fabric tops may not be able to provide effective insulation with regard to heating or cooling of the vehicle interior. Finally, fabric tops may be less effective with regard to blocking road or other ambient noise from entering the interior of the vehicle. As a result, many owners of convertible vehicles opt for a rigid top material (referred to herein as a hardtop). These tops provide substantial benefits with regard to security, thermal and sound insulation. Despite these advantages, hardtops can be heavy and difficult to remove and store. This is particularly the case when the owner of a vehicle is unable to obtain the assistance of a second person.

Figure 1:
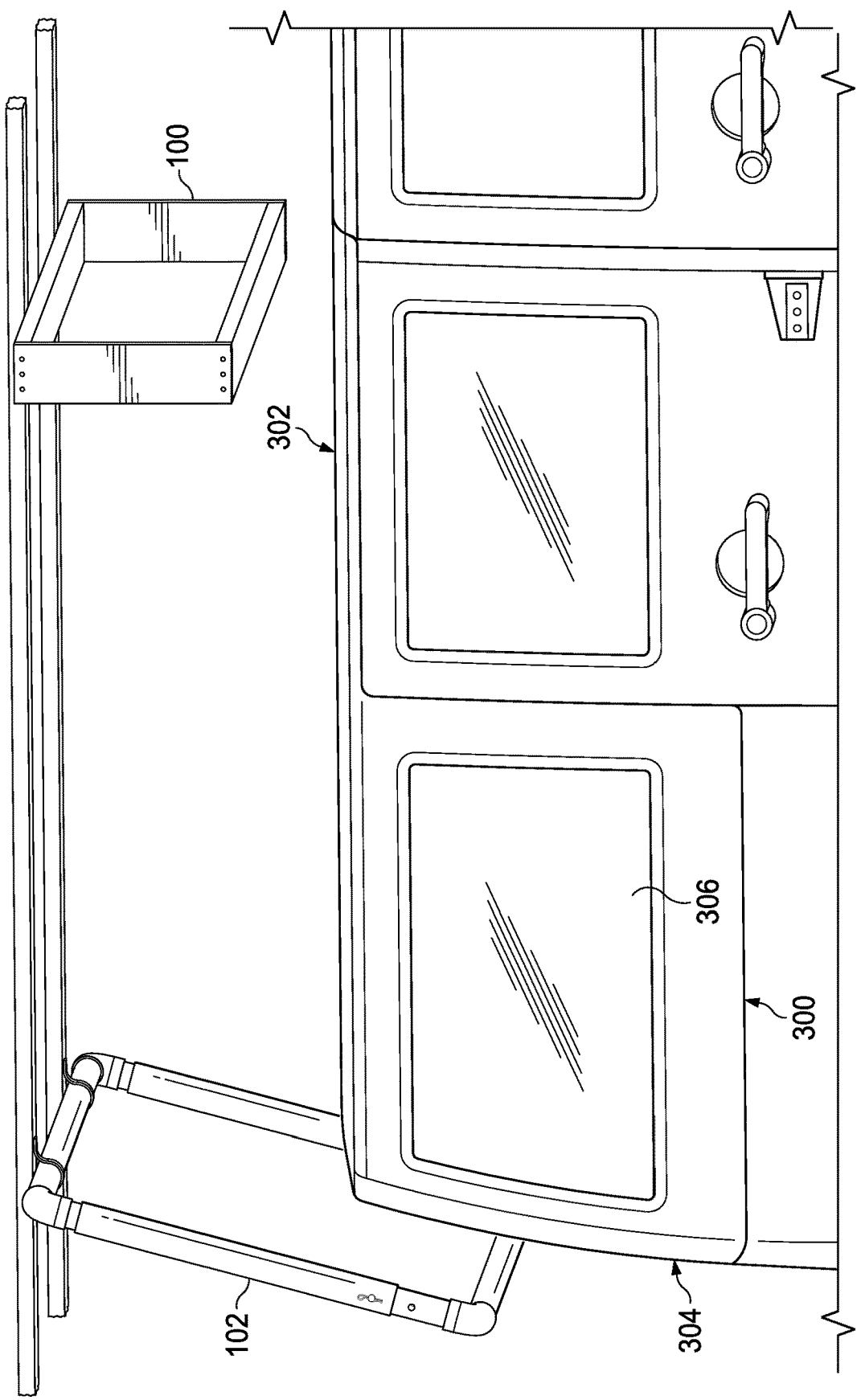
FIG. 1 is perspective view of an embodiment of the invention prior to use.

As is illustrated in FIG. 1, a hardtop 300 may comprise a front 302 and a back 304 section. As is illustrated by the hardtop used as an example for this description, the back section 304 may also comprise one or more windows 306 and generally be heavier and thicker than the front section 304. Because of the size and weight, lifting and removing such a hardtop 300 may require two people to ensure that the hardtop does not come into contact with the vehicle, resulting in damage to the paint or body panels of the vehicle.

As is illustrated in FIG. 1, an exemplary embodiment of the invention comprises a front 100 and rear 102 support arm. In this embodiment each arm is in a pivotably associated with the ceiling of the garage. Each arm is generally rectangular, and comprised of a top bar 104, a bottom bar 106, and two side bars 108 surrounding an inner aperture 110. The arms are located a predetermined distance apart from one another. In the exemplary embodiment of FIG. 1, the rear support arm 102 is larger than the front support arm 100, and comprises a comparatively larger aperture 110. For example, in some embodiments the rear support arm may be 4 ft. in height while the front support arm may only be 3 ft. in height. Of course, in various embodiments the dimensions may vary as desired. The bottom bar 106 of the rear support arm 102 is also located comparatively lower than the bottom bar 106 of the front support arm 100 when the support arms 100, 102 are in an initial position prior to use. The arms 100, 102 can be pivoted and positioned to suspend the hardtop away from the vehicle. In the embodiment of FIG. 1 the front support arm 100 is comprised of wood while the rear support arm is comprised of pipe. However, it will be recognized by one of skill in the art that a variety of materials and material combinations can be used for the support arms, including, but not limited to, wood, metal, plastic pipes and other plastic structures, and even hardened rubber. For example, in some embodiments both support arms may be made of pipe.

Figure 2:
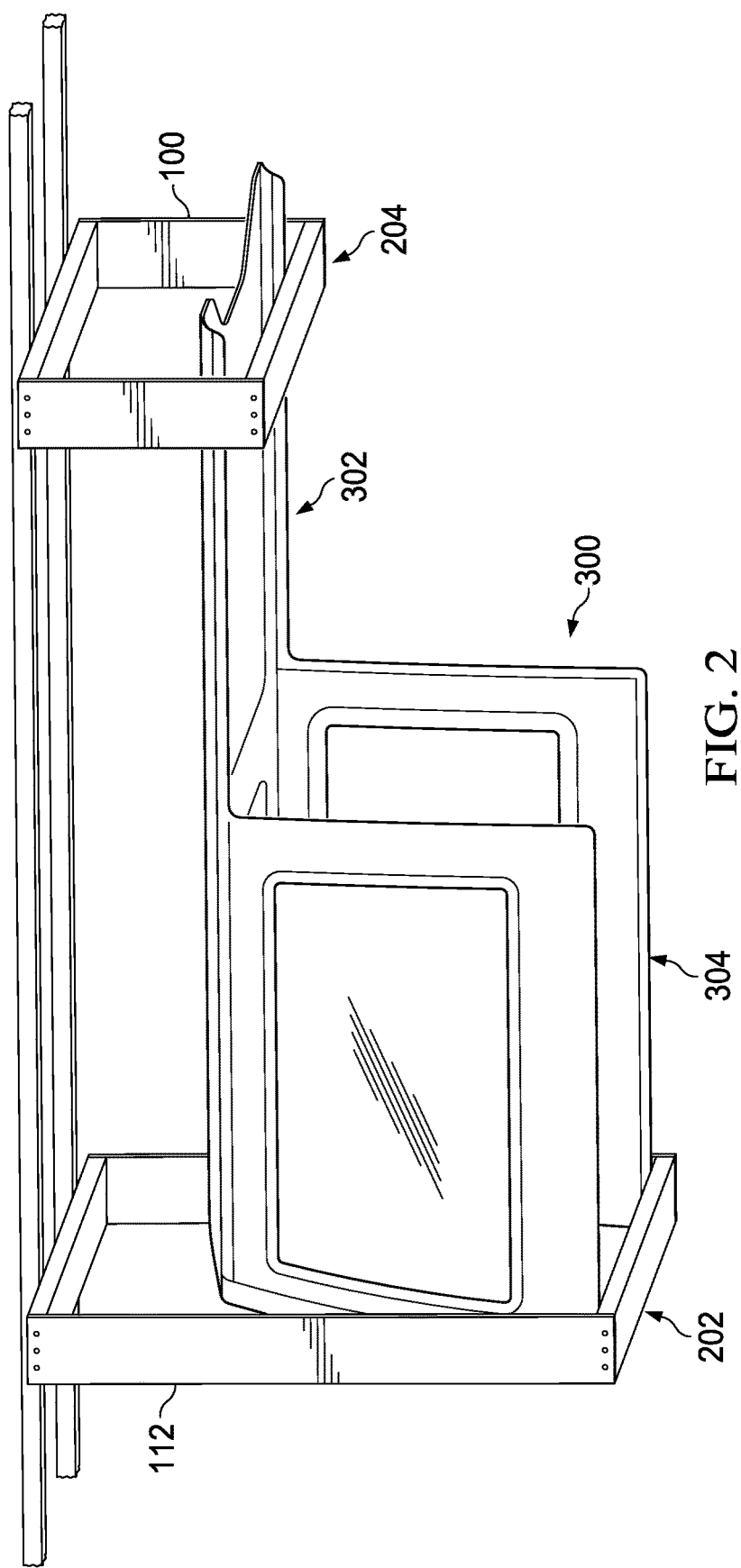
FIG. 2 is a perspective view of an embodiment of the invention shown suspending a vehicle top after removal from the vehicle.

Referring to FIG. 2, a second exemplary embodiment is shown where the rear support arm 112 is also comprised of wood. FIG. 2 illustrates how the support arms can support a hard top 300 in a fully suspended position. As is shown, the front support arm 108 may be positioned underneath the front section 302 of the hardtop. The rear arm 112 may be placed under the rear section 304 of the hardtop 300.

Figure 3:
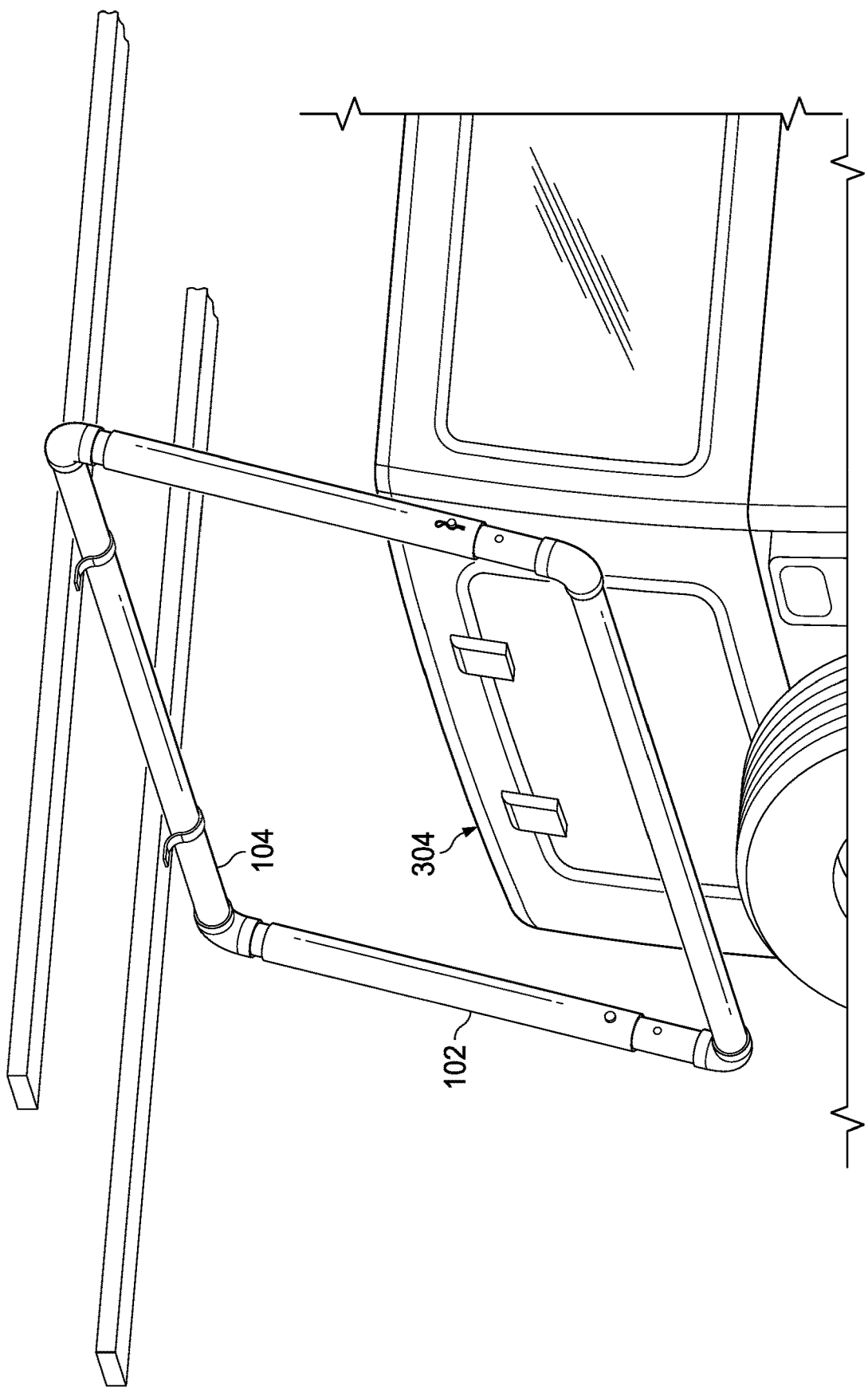
FIG. 3 is a perspective view of an embodiment of a rear support in position prior to suspending a vehicle top.
Figure 4:
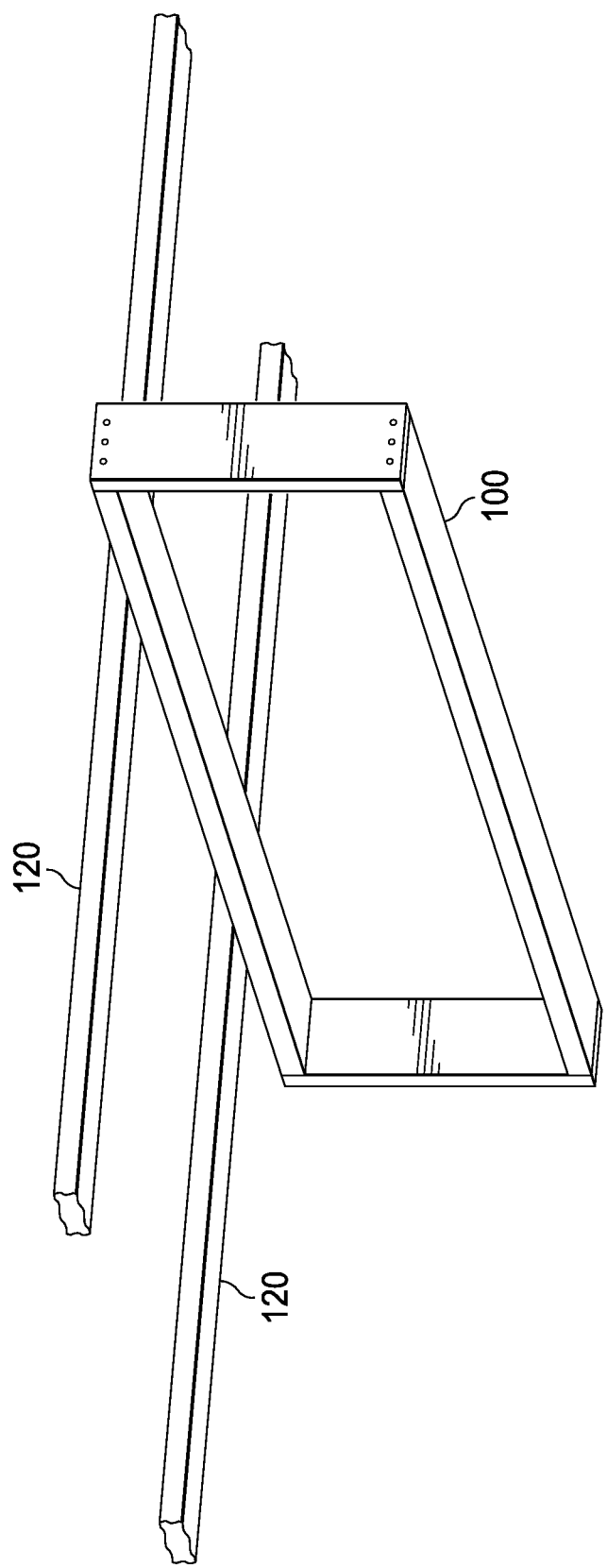
FIG. 4 is a perspective view of an embodiment of a front support arm in position prior to use.

In order to suspend the hardtop, an owner may position the vehicle such that the rear support arm comes into contact with the hardtop. An example of this is shown in FIG. 3. As is illustrated in FIG. 3, the rear support arm 102 is positioned over the back section 304 of the hardtop 300 when the vehicle is thusly positioned. FIG. 4 illustrates the front support 100 arm in a position ready to receive the front portion of the hardtop 100. Hinges (not illustrated), may be used to allow the front and rear support arm to swing forward and rearward. As is illustrated in FIG. 4, one or more supporting portions 120 may be used to permit the front 108 and rear 110 support arms to be affixed to a ceiling in an area such as a garage. The front 108 and rear 110 arms may be pivotably connected to the supporting structures 12 through the use of hinges or other types of fasteners. In other exemplary embodiments the front and rear arms may be adapted to be directly connected to a ceiling or other structure located above a vehicle.

Figure 5:
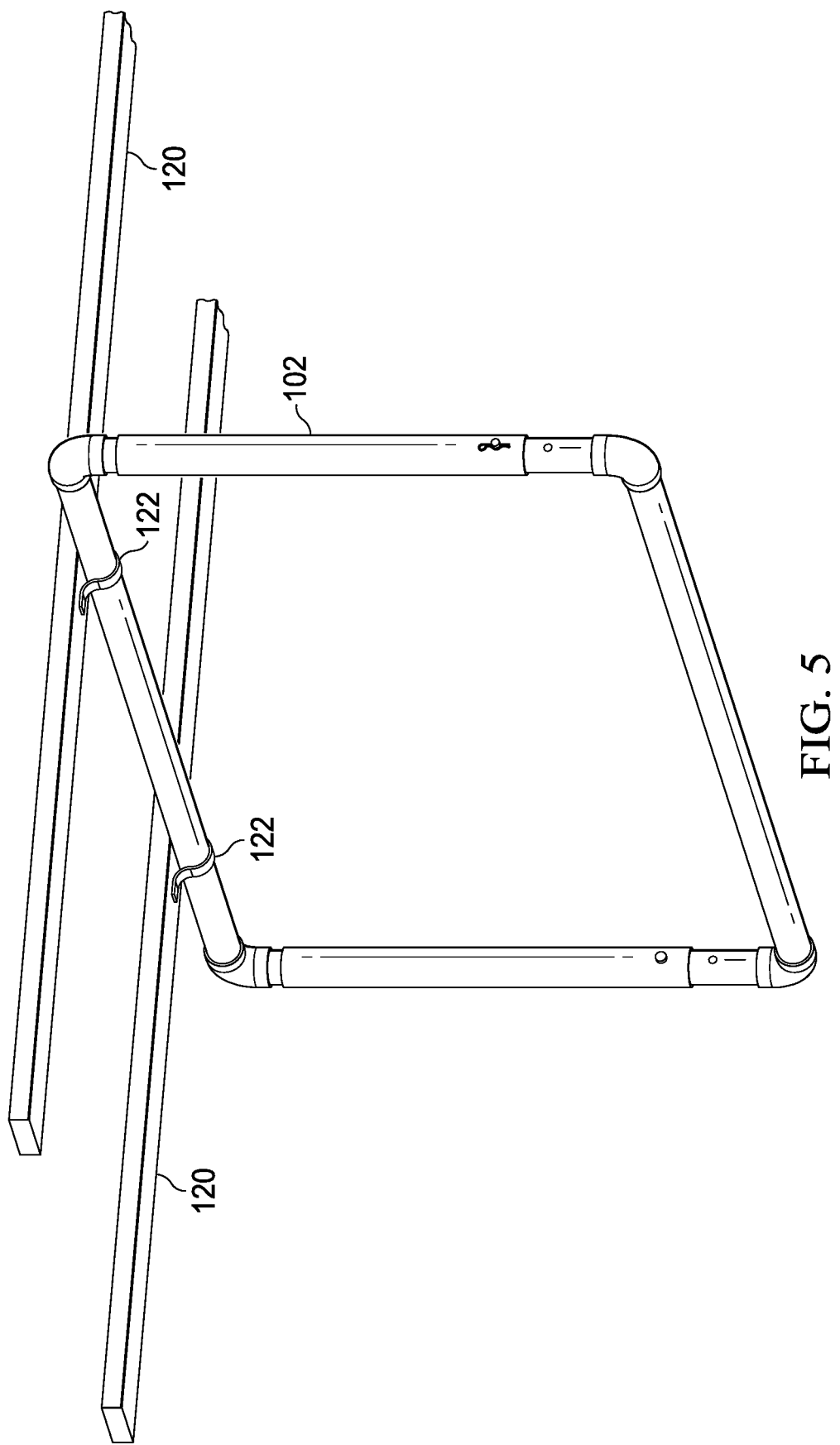
FIG. 5 is a perspective view of a rear support arm in position prior to use.

FIG. 5 illustrates an embodiment of a rear support arm assembly. As is shown, clamps 122 may be used to affix the rear support arm 102 to the supporting structures 120. This same assembly may be used to hold the front support arm as well. In such an embodiment, the clamps 122 may be sized such that the supporting arms may be shifted from side to side along the length of the top bar 104. This movement may be used to accommodate a vehicle which has been parked in a position that it is not aligned with the front 100 and rear 102 support arm.

Figure 6A:
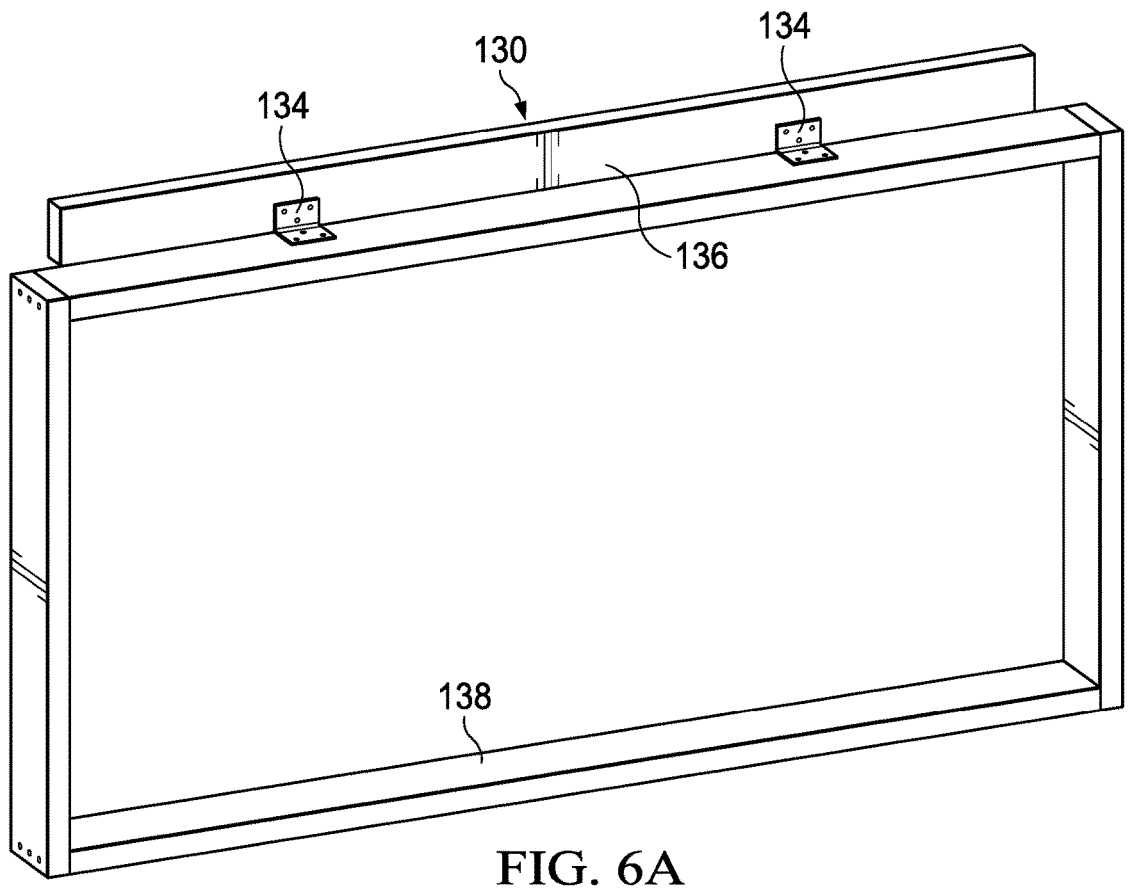
FIGS. 6*a* and 6*b* are perspective views of embodiments of rear and front support arms.
Figure 6B:
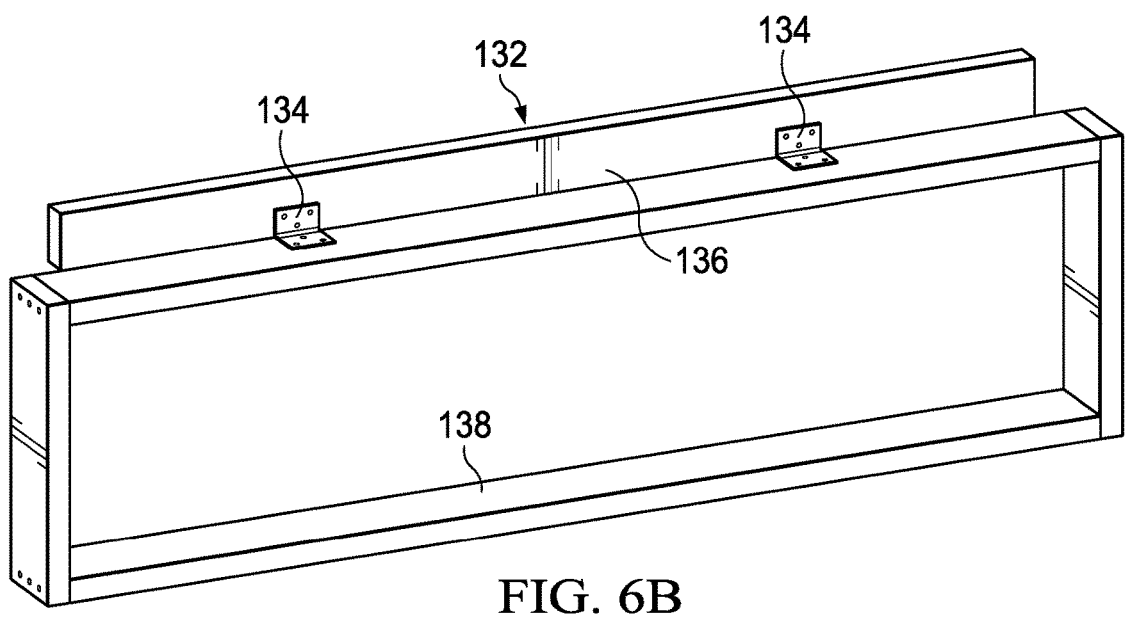

FIGS. 6A and 6B illustrate embodiments of a front 130 and rear 132 support arm that have been fabricated from material with a rectangular cross section. It should be noted that embodiments of the invention may be fabricated from materials with a multitude of cross section shapes in addition to rectangular and round and only need to be rigid enough to support the hardtop suspended from the invention. In the illustrated embodiment, hinges 134 are used rather than clamps to connect the arms to the support structures. The support structures may then in turn be secured to a ceiling with lag bolts into the trusses (not illustrated), or via other means. As is shown, the first support arm 130 may be smaller than the second support arm 132 to accommodate the size of the hardtop to be supported. Hardtops that are more uniformly sized from front to rear may require arms that are closer to the same length between the top section 504 and the support portion 604 of the support arm.

Figure 8:
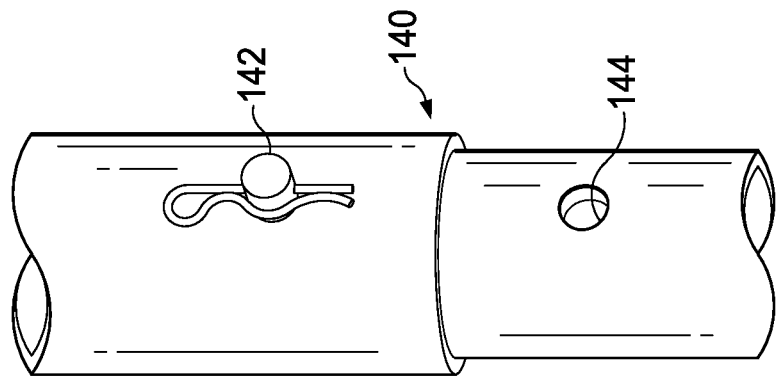
FIG. 8 is a perspective view of an adjustment mechanism employed in an embodiment of a support arm.
Figure 7:
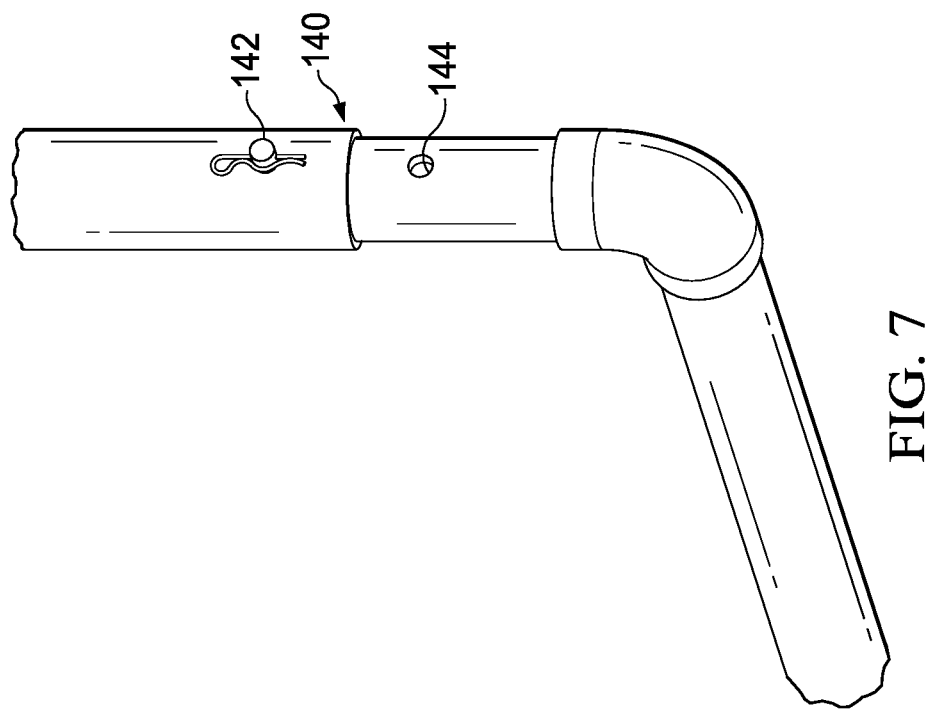
FIG. 7 is a perspective view of an exemplary embodiment of an adjustable support arm.
Figure 9A:
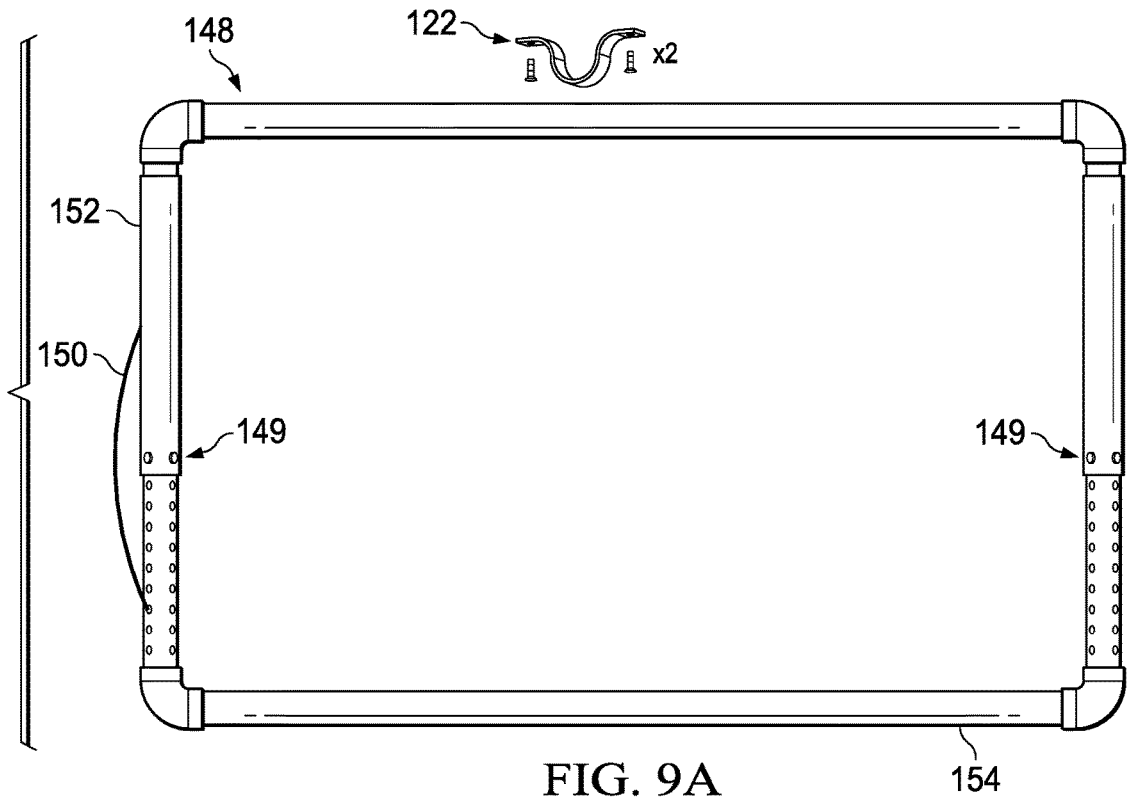
FIGS. 9*a* and 9*b* are front elevational views of exemplary embodiments of adjustable support arms.
Figure 9B:
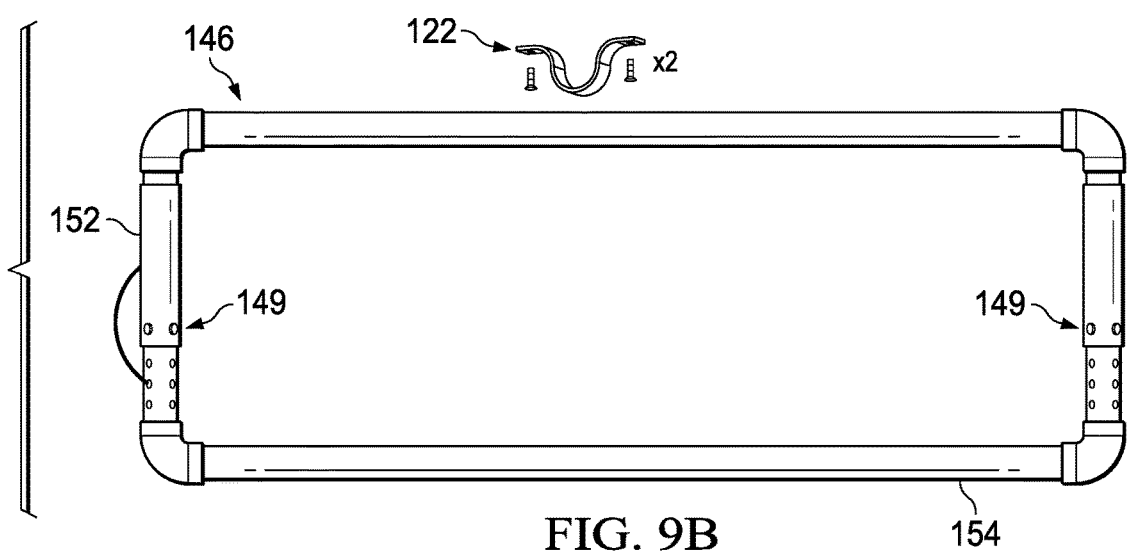

As is illustrated in FIGS. 7 and 8 in order to accommodate different configurations of hardtop, in some embodiments the support arms may have adjustable side sections 140. In one such embodiment may comprise a toggle fixing pin 142 and a series of adjustment holes 144 located in the lower part of said side sections. A user may adjust the front, rear, or both support arms to make the arms shorter or longer as required. In addition to accommodating various hardtop configurations, the arms may be shortened to cause the hardtop to be closer to the ceiling to which the invention is affixed in order to provide more clearance below the removed hardtop. Referring to FIGS. 9A and 9B, another embodiment of a front support arm 146 and rear support arm 148 comprising an adjustable plastic apparatus with toggles 149 is shown. In order to prevent the arms from falling in such an embodiment, one or more cables 150 may be attached at either end to the upper portion 152 and lower portion 154 of an arm. In other embodiments chains or similar structures may be used instead of cables to keep the upper and lower portions of an arm connected. In some embodiments the cable, chain, or other structure may be located inside the arm portions to present a cleaner appearance.

Figure 10A:
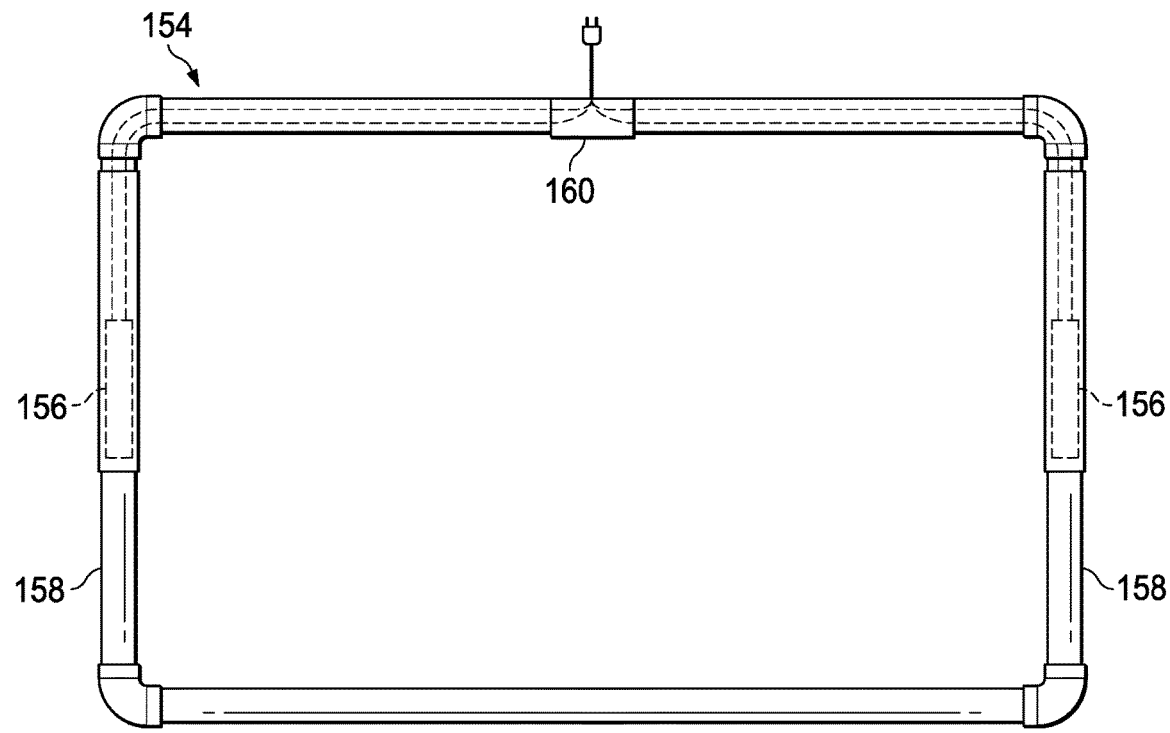
FIGS. 10*a* and 10*b* are front elevational views of exemplary embodiments of motorized adjustable support arms.
Figure 10B:
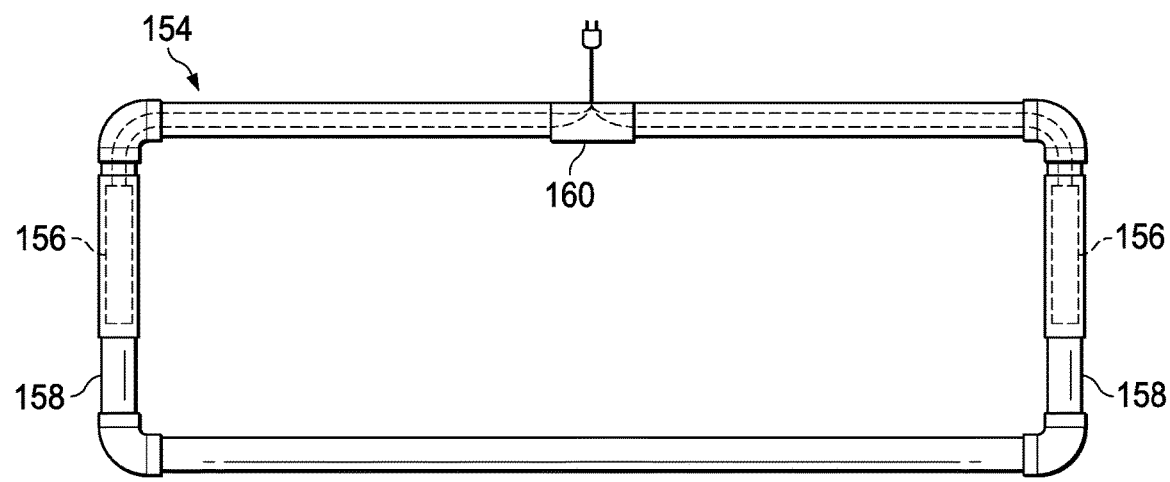

As is illustrated in FIG. 10, an embodiment of the invention may also be configured with a motorized element 156 in each arm 152, 154. Such motorized elements 1002 may be configured to extend or retract the side sections 158 in such embodiments. This may have the same effect as the toggle fixing pins of FIGS. 7, 8 and 9a-b. A motorized element may also be used to retract the side sections after the hardtop has been positioned on the front and rear support arms in order to provide more clearance underneath the hardtop in the garage or other space in which the invention is located. The motorized elements may be in electronic communication with a RF sensor that is associated with the respective support arm. The RF sensor may be adapted to receive signals from a wireless controller that can cause the RF sensor to initiate the motorized elements to operate and cause extension or retraction of the side sections. The motorized elements may be powered through an electric cord that extends away from the support arms and can be plugged into an outlet box or extension cord. In other embodiments of the exemplary embodiment the motorized elements may be associated with battery power in addition to, or in lieu of, means for being mains powered.

In order to use an embodiment of the invention, a user may position the vehicle such that a support arm is in contact with the hardtop. Referring to FIG. 3, the support arm may be rotated slightly about its top section 104. A user may enter the vehicle and disconnect the hardtop from the vehicle. Once disconnected, the user may lift a section of the hardtop so that the support arm 102 in contact with the hardtop will swing underneath the hardtop as is illustrated in FIG. 2 at 202. Once the support arm is underneath the hardtop, the user may lower the hardtop onto the support arm. At this point, the section of the hardtop in contact with the support arm is supported such that the portion of the hardtop is slightly above the vehicle. The user may then repeat the process with the front support arm 100 such that the support arm comes to rest under the front portion of the hardtop as is illustrated in FIG. 2 at 204. As is illustrated in FIG. 2, once the hardtop is supported by the front 100 and rear 102 support arm, the vehicle may be moved out from underneath the hardtop.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for the removal and storage of a hard top of a vehicle; said system comprising:
   a front support arm comprising a top section, a bottom section, and two side sections which form a rectangular shape defining a first aperture, wherein said front support arm is pivotably associated with a support structure, and wherein said front support arm is adapted to receive the front end of the hard top within said first aperture; and
   a rear support arm, said rear support arm comprising a top section, a bottom section, and two side sections which form a rectangular shape defining a second aperture, wherein said rear support arm is pivotably associated with said support structure such that said rear support arm is configured for pivoting movement independent of said front support arm, and wherein said rear support arm is adapted to receive the back end of the hard top within said second aperture;
   wherein the front and rear support arms are configured to fully suspend the hard top when the front end of the hard top is received within said first aperture and the back end of the hard top is received within said second aperture;
   wherein the two side sections of the front support arm are shorter than the two side sections of the rear support arm such that said first aperture is smaller than said second aperture.

2. The system of claim 1, wherein said front and rear support arms are made of pipe.

3. The system of claim 1, wherein said front and rear support arms are made of wood.

4. The system of claim 1, wherein said front and rear support arms are pivotably connected to said support structure via clamps, wherein said clamps are configured to permit lateral movement of the top sections of front and rear support arms within the clamps.

5. The system of claim 1, wherein said front and rear support arms are pivotably connected to said support structure via hinges.

6. The system of claim 1, wherein said front and rear support arms have adjustable side sections, each side section comprising:
   at least two adjustment holes located in a lower portion of said side sections;
   at least one toggle fixing pin associated with an upper portion of said side sections;
   said at least one toggle fixing pin adapted to be inserted into one or more of said at least two adjustment holes.

7. They system of claim 6, further comprising an attachment strap having a first end and a second end, said attachment strap connected on said first end to said upper portion of one of said side sections and connected on said second end to said lower portion of the same side section.

8. The system of claim 7, wherein said attachment strap is a cable.

9. The system of claim 8, wherein said attachment strap is located inside said side section.

10. The system of claim 1, further comprising:
    at least one motorized element, said at least one motorized element adapted to extend and retract said side sections of said front support arm.

11. The system of claim 10, further comprising:
    an RF sensor in electronic communication with said at least one motorized element; and
    a wireless controller, said wireless controller adapted to communicate with said RF sensor.

12. The system of claim 1, further comprising:
    at least one motorized element, said at least one motorized element adapted to extend and retract said side sections of said rear support arm.

13. The system of claim 12, further comprising:
    an RF sensor in electronic communication with said at least one motorized element; and
    a wireless controller, said wireless controller adapted to communicate with said RF sensor.

14. A system for the removal and storage of a hard top of a vehicle; said system comprising:
    a first pair of brackets configured to be mounted to a ceiling of a garage;
    a front support arm comprising a top section, a bottom section, and two side sections which form a rectangular shape defining a first aperture, wherein said front support arm is adapted to receive the front end of the hard top within said first aperture, and wherein said top section of said front support arm is received within said first pair of brackets such that the front support arm is configured for pivotable movement relative to the ceiling within said first pair of brackets;
    a second pair of brackets configured to be mounted to said ceiling of said garage;

a rear support arm comprising a top section, a bottom section, and two side sections which form a rectangular shape defining a second aperture, wherein said rear support arm is adapted to receive the back end of the hard top within said second aperture, and wherein said top section of said rear support arm is received within said second pair of brackets such that the rear support arm is configured for pivotable movement relative to the ceiling within said second pair of brackets and independent of said front support arm;

wherein the front and rear support arms are configured to fully suspend the hard top when the front end of the hard top is received within said first aperture and the back end of the hard top is received within said second aperture;

wherein the two side sections of the front support arm are shorter than the two side sections of the rear support arm such that said first aperture is smaller than said second aperture.

15. The system of claim 14, wherein:

said first and second pair of brackets are spaced apart from one another a distance to accommodate the hard top.

16. The system of claim 14, wherein:

the first and second pair of brackets are configured to permit lateral movement of the front and rear support arms within the first and second pair of brackets, respectively.

\* \* \* \* \*